(12) United States Patent
Tütek

(10) Patent No.: US 11,412,914 B2
(45) Date of Patent: Aug. 16, 2022

(54) STATIONARY SEALING GASKET

(71) Applicant: SERDAR PLASTİK SANAYİ VE TİCARET ANONİM ŞİRKETİ, Sincan/Ankara (TR)

(72) Inventor: Serdar Mustafa Tütek, Sincan/Ankara (TR)

(73) Assignee: SERDAR PLASTIK SANAYI VE TICARET ANONIM SIRKETI, Sincan/Ankara (TR)

( * ) Notice: Subject to any disclaimer, the term of this patent is extended or adjusted under 35 U.S.C. 154(b) by 76 days.

(21) Appl. No.: 16/618,156

(22) PCT Filed: May 17, 2018

(86) PCT No.: PCT/TR2018/000048
§ 371 (c)(1),
(2) Date: Nov. 28, 2019

(87) PCT Pub. No.: WO2018/231182
PCT Pub. Date: Dec. 20, 2018

(65) Prior Publication Data
US 2020/0178754 A1   Jun. 11, 2020

(30) Foreign Application Priority Data
May 30, 2017 (TR) .................... 2017/07938

(51) Int. Cl.
*A47L 15/42* (2006.01)
*F16J 15/32* (2016.01)

(52) U.S. Cl.
CPC ....... *A47L 15/4246* (2013.01); *A47L 15/4225* (2013.01); *A47L 15/4204* (2013.01); *A47L 15/4223* (2013.01); *A47L 2501/05* (2013.01); *E05Y 2900/304* (2013.01); *F16J 15/32* (2013.01)

(58) Field of Classification Search
CPC ............ A47L 15/4246; A47L 15/4225; A47L 15/4204; A47L 15/4223; A47L 2501/05; E05Y 2900/304; F16J 15/32
See application file for complete search history.

(56) References Cited

U.S. PATENT DOCUMENTS

2016/0029871 A1 *   2/2016   Kim ................... A47L 15/4225
                                                          134/184

FOREIGN PATENT DOCUMENTS

DE   10061885 A1 *   7/2002   ............. F16J 15/062
EP   2957424 A1 *   12/2015   ............. B32B 27/18

\* cited by examiner

*Primary Examiner* — Michael E Barr
*Assistant Examiner* — Pallavi Chitta

(57) ABSTRACT

The stationary gasket used in all kinds of dishwashers and similar household appliances, characterized in that; it ensures the sealing not by being compressed but by stretching and ensures sealing in both ways with a single part.

1 Claim, 2 Drawing Sheets

STATIONARY SEALING GASKET

This invention relates to a gasket which is used in all kinds of dishwashers and similar household appliances, made of fully recyclable thermoplastic material and consisting of a single piece, not dropping easily by being folded, providing the sealing by stretching not by tightening and providing both way sealing to gasket with a single piece. The gasket that is subject matter of the invention is manufactured by 2 k technology.

TECHNICAL FIELD OF THE INVENTION

This invention relates to a gasket which is used in all kinds of dishwashers and similar household appliances, made of fully recyclable thermoplastic material by the 2 k injection technology and consisting of a single piece, not dropping easily by being folded, providing the sealing by stretching not by tightening and providing both way sealing to gasket with a single piece.

STATE OF THE ART

In the state-of-the-art, in pump systems used in all dishwashers, an additional sealing member (O-ring, gasket and the like) is used typically to ensure sealing. However, these sealing gaskets drop down from the place they are placed or do not fit properly during assembly. Due to this reason, operator is not able to recognize this when grouping these parts and the sealing member mounted can be deformed during the assembly. That leads sealing problems.

Furthermore, since these sealing members used do not constitute an integrity with the parts they are connected, the sealing is ensured by compressing between two rigid plastic parts. These sealing members lose their functionalities over time due to pressure in operating environment and create gap between the rigid plastics because of the effect of the pressure and thus leading sealing problems.

BRIEF DESCRIPTION OF THE INVENTION

The subject of the present invention aims the solution of the sealing problems resulting from operator failures in existing systems by introducing gasket system providing full sealing in both ways with a single piece by providing the sealing by stretching not by compressing between two rigid plastics and manufactured by 2K injection system in a single piece concerning the sealing problems, which are resulting from the faults of the operator, of the gasket systems providing sealing in all dishwashers by using an additional component.

DETAILED DESCRIPTION OF THE INVENTION

This invention relates to gasket system serving as sealing member after the mounting of tub and water tank which are used in dishwasher. This is provided by O-ring and similar additional sealing members in existing systems. By this measure, these sealing members may not be fitted to the places because of the faults of users during the assembly and cannot properly perform their functionality while being damaged during mounting.

This gasket is a sealing member placed between tub and tank and produced in single piece by utilizing 2K injection technology during manufacturing. By means of the connecting tabs located at the edges of the plastic on which the gasket is pressed, it is ensured that it doesn't dislocate during mounting when it is attached to the tank. Furthermore, in existing systems, gaskets are provided such that they are compressed between two rigid plastic body walls. The present invention is based on the fact that the gasket which is attached to the housings on the tank by fitting the connecting tabs that are provided thereon and which is manufactured in a single piece by injecting softer thermoplastic material on the rigid plastic by the 2K technology, stretches by contacting the wall at lower portion of the tub after being fixed, thus provides a long-life sealing by grouping easier than the existing systems.

The gasket is made of thermoplastic material and has softer structure than the dishwasher tank to which it is mounted. It stretches by means of its soft and convex structure and it is positioned by stretching between two rigid plastics. The gasket is fixed on the tank it is attached by virtue of the connecting tabs located on the rigid plastic.

LIST OF REFERENCES

1—Stationary gasket
2—Tub
3—Tank
4—Section view

The subject matter of the present invention is a gasket which is used in all kinds of dishwasher and similar household appliances, manufactured in single piece by the 2 technology concerning the sealing problems, being grouped easily and not dropping, providing full sealing in both ways with a single part, performing the sealing not by being compressed between two rigid plastics but by stretching and thus, designed for preventing the problems resulting from the faults of operator and characterized by having tub (2) and stationary gasket (1) and tank (3).

Figure 1:
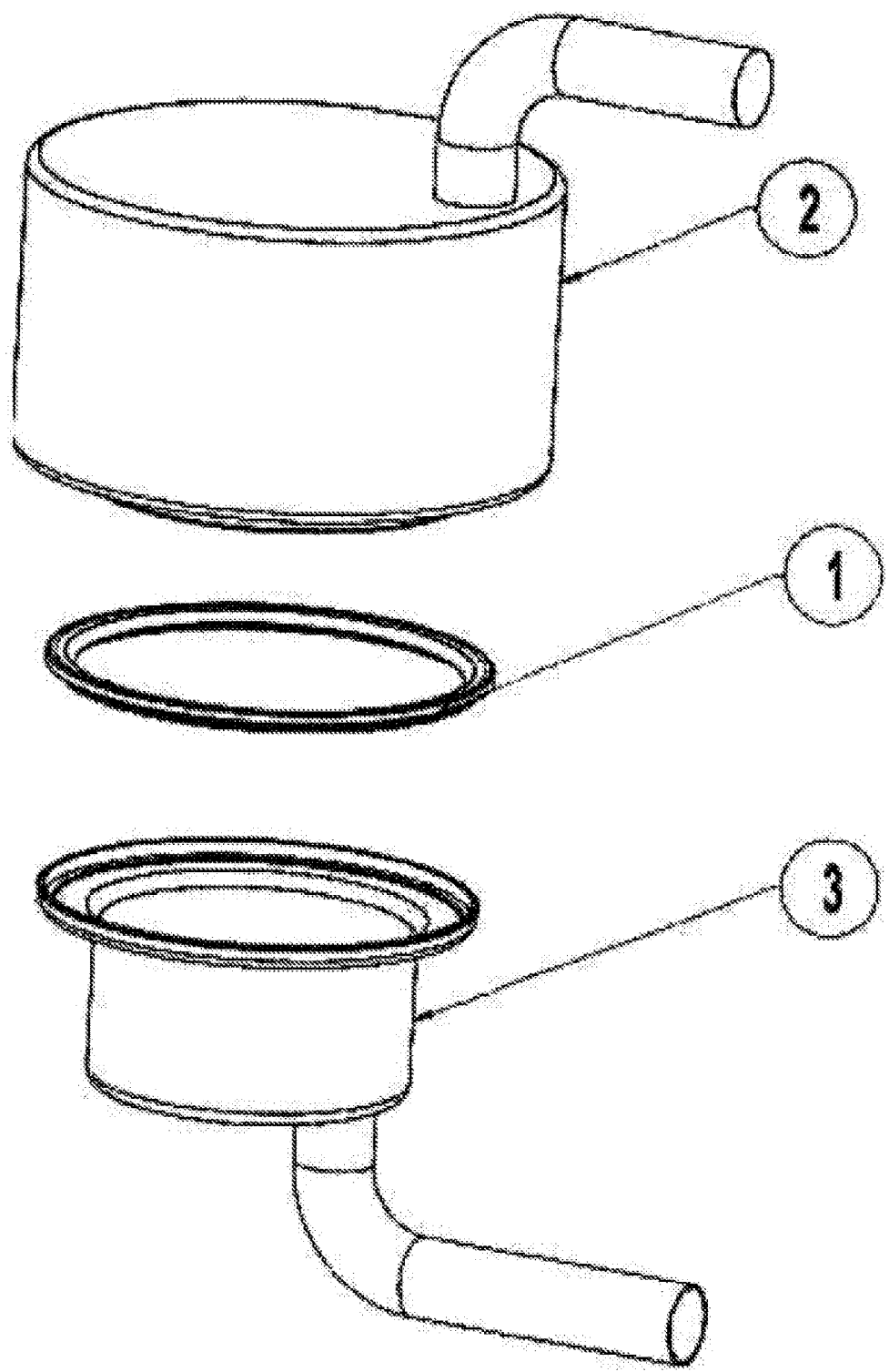
FIG. 1 is a boom illustration of the stationary gasket.

In FIG. 1, Boom illustration of the stationary gasket (1) is seen. The stationary gasket (1) provides sealing by being mounted by stretching between lower tank (3) and upper tub (2) since it is produced from soft thermoplastic material.

Figure 2:
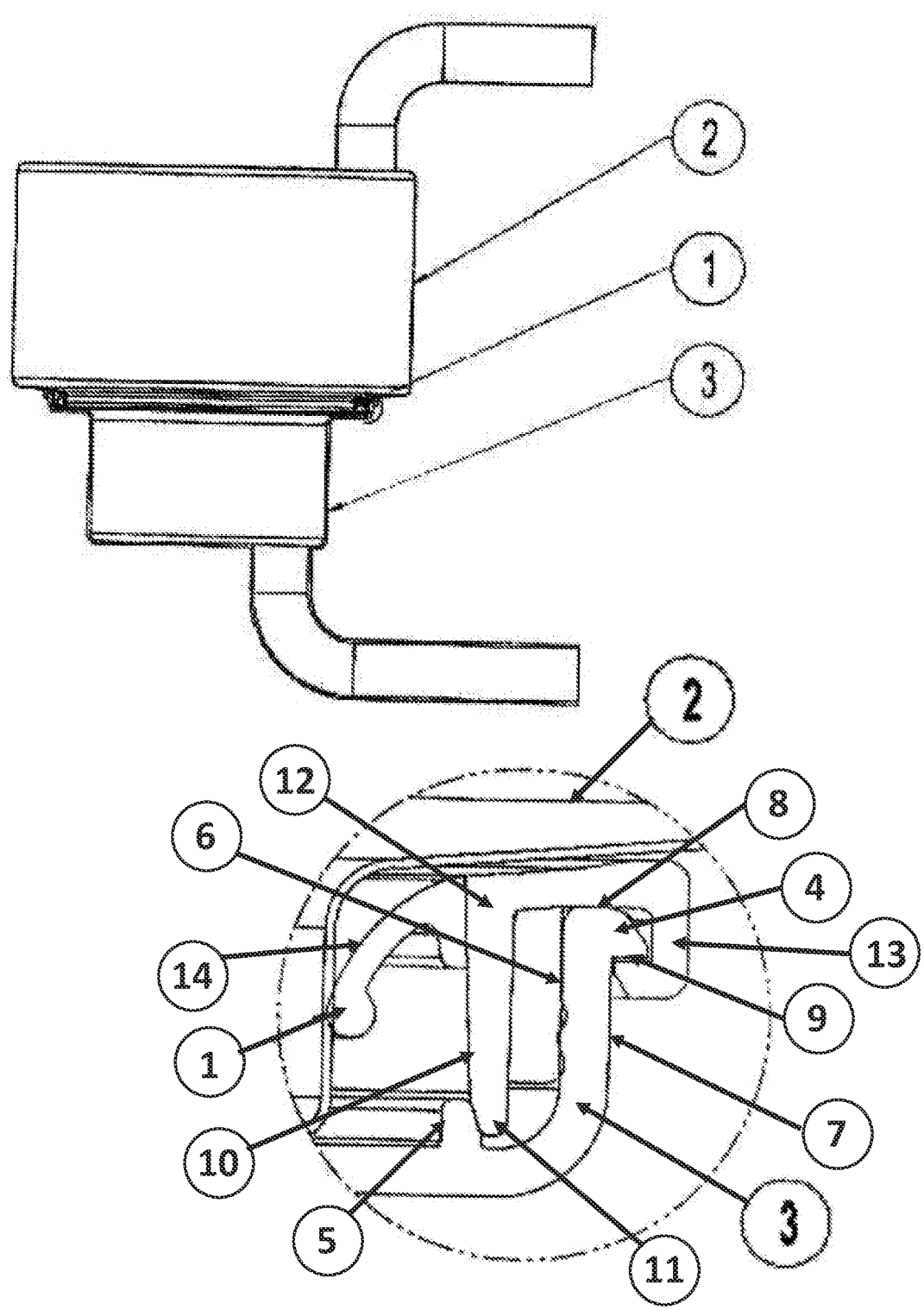
FIG. 2 is section view of the stationary gasket.

In FIG. 2, section view of the stationary gasket (1) is seen. The stationary gasket (1) is secured by engaging the housings located on the tank (3) by means of its connecting tabs located thereon. Thus, it cannot be removed from its place during mounting and when the operator mounts the tank (3) with the tub (2), the stationary gasket (1) stretches by contacting the wall of the tub (2) and thus, the gasket is not deformed because of operator's fault and it properly performs the sealing.

The sealing is now discussed in greater detail. In an embodiment, the stationary gasket (1) may be configured to ensure leak-proof sealing in a contact region between a first part and a second part, wherein the first part is the tank (3) and the second part is the tub (2). The first part (3) comprises of a first connecting tab (4), a second connecting tab (5), an internal surface (6) and an external surface (7). The first connecting tab (4) further comprises of a top surface (8) and a bottom surface (9), wherein the first connecting tab (4) extends laterally from the external surface (7) of the first part (3), and the second connecting tab (5) extends vertically towards the second part (2) from the internal surface (6) of the first part (3). The stationary gasket (1) comprises of a leg portion (10) comprising a first end (11) and a second end (12), a hook portion (13), and a flap portion (14). The first end (11) of the leg portion (10) is free and the hook portion (13) laterally extends from the second end (12) of the leg portion (10) in a first direction. The flap portion (14) laterally extends from the leg portion (10) in a second direction, which is opposite the first direction.

In an embodiment, the hook portion (13) receives the first connecting tab (4) comprising the top surface (8) and the bottom surface (9). The hook portion (13) presses against the top surface (8) and interfaces with the bottom surface (9), wherein the pressing of hook portion (13) against the top surface (8) resists movement of the fluid and the interfacing of the hook portion (13) with the bottom surface (9) prevents vertical movement of the stationary gasket (1) towards the second part (2). At least a part of the leg portion (10) towards the first end (11) presses against the second connecting tab (5), wherein the pressing of the leg portion (10) against the second connecting tab (5) resists movement of the fluid and the flap portion (14) interfaces and presses against the second part (2), thereby resisting movement of the fluid.

What is claimed is:

1. A stationary gasket used in household appliances, characterized in that the stationary gasket ensures a leak-proof sealing in a contact region between a first part and a second part, wherein the sealing is by stretching of the stationary gasket between the first part and the second part, wherein:
   the first part comprises a first connecting tab, a second connecting tab, an internal surface and an external surface, wherein,
      the first connecting tab extends laterally from the external surface of the first part; and
      the second connecting tab extends vertically towards the second part from the internal surface of the first part;
   the stationary gasket comprises a leg portion comprising a first end and a second end, a hook portion, and a flap portion, wherein,
      the first end of the leg portion is free and the hook portion laterally extends from the second end of the leg portion in a first direction; and
      the flap portion laterally extends from the leg portion in a second direction, which is opposite the first direction;
   the hook portion receives the first connecting tab comprising a top surface and a bottom surface, wherein the hook portion presses against the top surface and interfaces with the bottom surface, wherein the pressing of hook portion against the top surface resists movement of the fluid and the interfacing of the hook portion with the bottom surface prevents vertical movement of the stationary gasket towards the second part;
   at least a part of the leg portion towards the first end presses against the second connecting tab, wherein the pressing of the leg portion against the second connecting tab resists movement of the fluid;
   the flap portion interfaces and presses against the second part, thereby resisting movement of the fluid; and
   the stationary gasket is produced in a single piece by injecting (2K injection technology) a softer thermoplastic material on a rigid plastic before the rigid plastic is moved out of a mold.

* * * * *